March 30, 1943. G. W. BLAIR 2,315,391
CUSHION
Filed Dec. 16, 1939
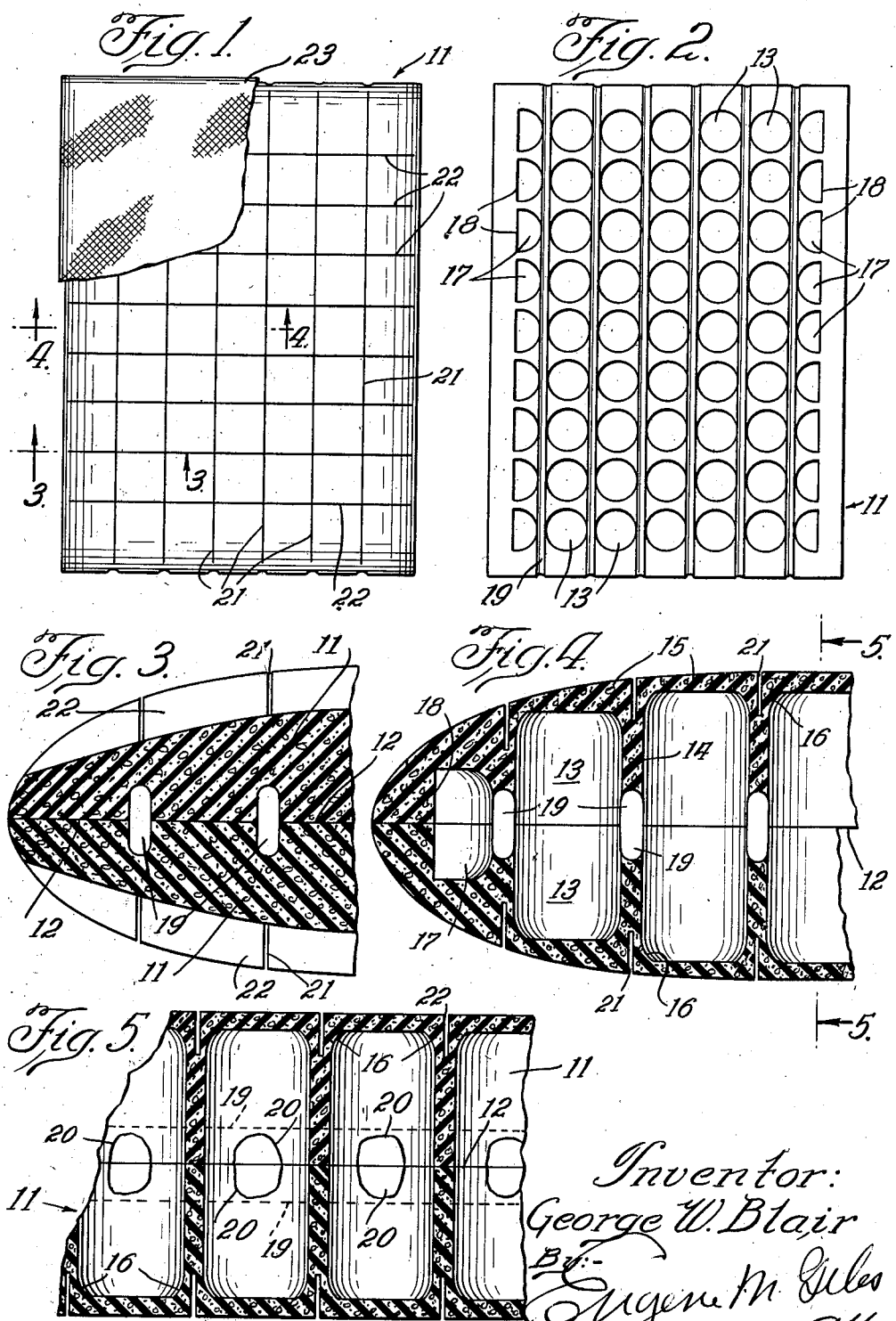
Inventor:
George W. Blair Patented Mar. 30, 1943

2,315,391

UNITED STATES PATENT OFFICE 2,315,391

CUSHION

George W. Blair, Mishawaka, Ind., assignor to Mishawaka Rubber and Woolen Manufacturing Company, Mishawaka, Ind., a corporation of Indiana Application December 16, 1939, Serial No. 309,510

10 Claims. (Cl. 5—337)

My invention relates to cushions of sponge rubber or similar material and has reference more particularly to a cushion structure suitable for use as a head rest or pillow for sleeping purposes.

Cushions suitable for use as pillows for sleeping purposes or the like not only require low supporting power, or test as it is commonly referred to, and low internal friction so as to insure the necessary high degree of softness to yield appreciably and easily under the weight of that part of the person supported thereon and insure maximum comfort but it is also important that the cushion be as free in its softness as possible, with all parts of the surface freely and independently compressible without any restrictive effect of surface tension or otherwise which might interfere with completeness and uniformity of the softness or prevent close conformity of the cushion surface to the contour of the supported part of the person and uniformity of support throughout the contacting area.

It is desirable that such cushions or pillows be of light weight and that when pressure is relaxed thereon they should automatically return to their normal shape without packing down in use as conventional pillows are accustomed to do, although it is at the same time essential for maximum ease and comfort that the cushion have suitable hysteresis properties to insure sufficiently slow and easy response to pressure and relaxation of pressure thereon to avoid any objectionable feeling of springiness or tendency to rebound.

The principal objects of my invention are to provide an improved cushion suitable for use as a pillow and having the desirable and essential characteristics above mentioned; to construct such cushion or pillow of a spongy rubber or rubber like material such as foamed rubber latex; to permit convenient manufacture of such cushions by molding; to provide molding equipment which is especially adapted to produce a satisfactory cushion for use as a pillow; and to insure appropriate air escapement and ventilation— these and other objects being accomplished as pointed out hereinafter and as shown in the accompanying drawing in which:

Fig. 1 is a top view of a pillow constructed in accordance with my invention and showing part of a fabric covering therefor;

Fig. 2 is a plan view of the inner side of one of the half sections of which the pillow is composed;

Fig. 3 is an enlarged fragmentary sectional view on the line 3—3 of Fig. 1;

Fig. 4 is a similar sectional view on the line 4—4 of Fig. 1;

Fig. 5 is a similar sectional view on the line 5—5 of Fig. 4.

The cushion of this invention is preferably made of foamed rubber latex which is commonly prepared either by whipping the compounded latex containing a foaming agent into a foam or stirring the compounded latex into a separately prepared foam, this prepared foamed latex being molded and vulcanized in the appropriate shape for the cushion or pillow. In the illustrated structure the cushion is of approximately the conventional elongated rectangular flattened elliptical pillow shape and is composed of two identical half sections 11 which have flat inner faces cemented together throughout the area thereof as indicated at 12 and each half section 11 has a convex outer surface so that when the half sections 11 are cemented together at 12 a substantially unitary cushion body is provided which is of substantially the conventional pillow shape.

The foamed latex is preferably prepared to produce a spongy material of low specific gravity, not only for light weight but also to insure an extremely soft texture and with intercommunicating cells to permit air circulation throughout the mass for ventilation and to contribute hysteresis properties which insure slow and easy compressive and expansive movements without objectionable springiness.

Each half section 11 is molded with corresponding cored out cylindrical cavities 13 arranged close together in longitudinal and transverse parallel rows as shown in Fig. 2 with relatively thin intermediate walls 14 of the spongy rubber, these cored out cavities being of varying length, depending on the outer contour of the pillow, so as to extend similarly close to the outer convex surface of the half section leaving a web 15 of substantial thickness of the spongy material beyond the outer end of each cavity 13 as shown in Fig. 4. In practice I have found that core cavities of a size between one and three quarters and two inches in diameter are quite satisfactory and it is preferred to round the cavities marginally at the outer ends as indicated at 16.

Along the lateral margins of the half sections are core cavities 17 which are relatively short and semi-cylindrical with the flat sides 18 thereof at the outer side thereof as shown particularly in Fig. 2. All of the core cavities 13 and 17 of each section 11 are arranged in matching relation to the corresponding core cavities of the other section 11 so that the open ends coincide when the flat faces of the two sections are cemented together as is clearly shown in Figs. 4 and 5, thus providing the assembled cushion with openings extending almost entirely through the cushion but closed at the opposite ends and affording an internal structure of interconnected web like walls with the result that the cushion has low supporting power with low internal friction and is exceedingly soft and comfortable.

To avoid air trapping which would retard free compressive and expansive action and would also impart undesirable springiness, it is desirable to insure free flow of air to and from the cavities 13 and 17 in compression and expansion of the pillow and for this purpose, each half section 11 is formed at the flat side thereof with longitudinal grooves or channels 19 between the longitudinal rows of cavities 13 and in communication therewith as indicated at 20 and these grooves or channels extend out through the ends of the section so that when the two sections 11 are assembled in pillow form the grooves or channels 19 of each section 11 register with the grooves or channels 19 of the other section thereby forming substantial air passageways midway between the top and bottom of the cushion which extend longitudinally entirely through the cushion and open through the cushion ends. Thus each cavity 13—13 of the assembled cushion has two diametrically opposed openings 20 leading therefrom into channels 19—19 and each cavity 17—17 has a similar opening 20 at the inner side leading into a channel 19—19, thereby affording sufficiently easy entrance and exit of air to and from the cavities 13—13 and 17—17 to permit free compressive and expansive action of the cushion.

These air passageways 19—19 serve in addition to insure ventilation of the interior of the cushion, and as the spongy rubber material of the cushion is of intercommunicating open cell texture, compression and expansion of the cushion causes air movement within the mass and ventilation thereof.

It is important, as above pointed out, to avoid surface tension which might interfere with freedom of softness or impose strains in folding or bending which would prevent the surface of the cushion conforming closely to the contour of the part of the person supported thereon and this is accomplished in my invention by providing the surfaces of the pillow with spaced, parallel, longitudinal slits 21 and similar transverse slits 22 which are preferably of a depth to extend inwardly slightly beyond the ends of the cavities 13 and located in planes midway between the cavities as shown in Figs. 4 and 5. These slits are very narrow so that they do not appreciably interfere with the continuity of the pillow surface and being located directly above the division walls 14 between the cavities 13—13 and 17—17 these slits, because of the extra freedom and flexibility of the slit margins, compensate somewhat for the wall resistance with the result that there is no appreciable difference in supporting effect above the cavities on the one hand and above the walls 14 on the other hand, and the cushion thus has substantially uniform softness and cushioning characteristics throughout the entire surface area.

The usual pillow case may, of course, be employed for covering this pillow or it may be permanently covered with any desired covering as for example for davenport use, a fragmentary portion of a covering being shown at 23 in Fig. 1, and it will be understood that the cushion may be made in forms other than that illustrated and that the invention or certain features thereof may be employed in other kinds of cushions.

While I have shown and described my invention in a preferred form, I am aware that various changes and modifications may be made therein without departing from the principles of my invention, the scope of which is to be determined by the appended claims.

I claim as my invention:

1. A cushion of the class described, comprising a relatively flat body of spongy rubber like material having many laterally spaced substantially parallel openings therein spaced from and extending between the top and bottom surfaces of the cushion body, and said body having air passageways enclosed therewithin and communicating along their sides with said openings and having their ends opening outwardly through the edges of the cushion body.

2. A cushion of the class described, comprising a relatively flat body of spongy rubber like material having convex upper and lower surfaces, said body having many laterally spaced substantially parallel openings therein spaced from and extending between said surfaces, said body having air passageways enclosed therewithin and extending therethrough in a plane substantially parallel with and between said upper and lower surfaces and communicating with said openings, said passageways opening at their opposite ends through the edges of the cushion.

3. A cushion of the class described, composed of two superposed relatively flat substantially semi-elliptical half sections of spongy rubber like material united in face to face relation, each section having many substantially parallel openings therein extending outwardly from the united face thereof and each section having a convex surface portion closing the outer ends of its said openings, said sections having matching channels in their united faces communicating with said openings and leading to the exterior of the cushion through the edges thereof.

4. A cushion of the class described, comprising superposed sections of elastically yieldable material in face to face relation, each section having substantially parallel openings therein extending outwardly from the inner face thereof and terminating short of the opposite outer face of the section, said sections having matching channels in their meeting faces communicating with said openings and leading to the exterior of the cushion through the edges thereof.

5. A cushion of the class described, comprising superposed sections of spongy rubber-like material in face to face relation, each section having substantially parallel openings in its inner face and extending outwardly towards and terminating short of the outer surface of said section, said sections having matching channels in their meeting faces communicating with said openings and leading to the exterior of the cushion through the edges thereof, and the exterior surface of each section being provided with slits located between the outer closed ends of said openings.

6. A cushion member of the class described, comprising a body of spongy rubber-like material having a plurality of openings therein intersecting one face of the member and terminating short of the opposite face of the member, that face of the member intersected by the openings having channels extending between the openings and in communication therewith, the ends of the channels opening through opposite edges of the member, and the opposite face of the member being provided with slits located between the closed ends of the openings, said slits being of narrow width and having their walls substantially abutting so as to not materially interfere with the continuity of the cushion surface.

7. A cushion of the class described, comprising a body of spongy rubber-like material having a plurality of internal cavities arranged in substantially parallel rows, said cavities being closed at their opposite ends, and air passageways within said body between said rows and communicating along their sides with said cavities and leading to the exterior of the cushion through an edge thereof.

8. A cushion of the class described, comprising a body of spongy rubber-like material having a plurality of internal substantially parallel cavities vertically disposed therewithin and extending toward the upper and lower surfaces of the cushion, said cavities being closed at their opposite ends, and substantially horizontal air passageways within said body between said cavities and communicating along their sides with cavities and leading to the exterior of the cushion through an edge thereof.

9. A cushion of the class described, comprising contiguous sections of spongy rubber-like material in face to face relation, said sections having substantially parallel matching cavities therein extending outwardly from the meeting faces and closed at their outer ends, said sections having matching channels in their meeting faces communicating with said cavities and leading to the exterior of the cushion through an edge thereof.

10. A cushion of the class described, comprising superposed sections of spongy rubber-like material in face to face relation along a median horizontal plane, said sections having substantially parallel matching cavities therein extending outwardly from the meeting faces and closed at their outer ends, said sections having matching channels in their meeting faces communicating with said cavities and leading to the exterior of the cushion through an edge thereof.

GEORGE W. BLAIR.